United States Patent [19]

Gleim

[11] Patent Number: 5,233,276
[45] Date of Patent: Aug. 3, 1993

[54] MOTOR CONTROL CIRCUIT

[75] Inventor: Günter Gleim, Villingen, Fed. Rep. of Germany

[73] Assignee: Deutsche Thomson-Brandt GmbH, Fed. Rep. of Germany

[21] Appl. No.: 730,019

[22] Filed: Jul. 12, 1991

Related U.S. Application Data

[63] Continuation of Ser. No. 328,255, Feb. 23, 1989, abandoned.

[30] Foreign Application Priority Data

Jun. 30, 1987 [DE] Fed. Rep. of Germany ....... 3721477

[51] Int. Cl.$^5$ .............................................. H02P 3/00
[52] U.S. Cl. .................................... 318/368; 318/105
[58] Field of Search ................. 318/254, 254 A, 138, 318/439, 105–110, 719, 775–778, 799–803, 85, 74, 280–286, 257, 261, 440, 442, 92, 368, 369, 375, 377, 759, 760, 763; 312/368; 369, 375, 377, 759, 760, 763

[56] References Cited

U.S. PATENT DOCUMENTS

| | | | |
|---|---|---|---|
| 1,701,382 | 2/1929 | Macmillan | 318/740 |
| 1,900,594 | 3/1933 | Watson | 318/105 |
| 2,397,183 | 3/1946 | Kilgore et al. | 318/108 X |
| 2,422,906 | 6/1947 | Johnson | 318/777 X |
| 3,168,688 | 2/1965 | Roggenkamp | 318/109 X |
| 3,443,186 | 5/1969 | Martin | 318/257 |
| 3,562,612 | 2/1971 | Munson | 318/106 |
| 3,611,102 | 10/1971 | Leenhouts | 318/696 |
| 3,633,084 | 1/1972 | Rakes | 318/377 X |
| 3,819,996 | 6/1974 | Habisohn | 318/777 |
| 4,072,883 | 2/1978 | Beiter | 318/257 |
| 4,145,645 | 3/1979 | Price et al. | 318/777 X |
| 4,263,540 | 4/1981 | Brandt et al. | 318/775 |
| 4,349,772 | 9/1982 | Weiss | 318/799 |
| 4,438,381 | 3/1984 | Field, II | 318/777 X |
| 4,525,658 | 6/1985 | Yanagida | 318/317 |
| 4,845,417 | 7/1989 | Ohkubo et al. | 318/778 |
| 4,879,498 | 11/1989 | Shinohara et al. | 318/254 |

FOREIGN PATENT DOCUMENTS

| | | | |
|---|---|---|---|
| 2719200 | 11/1978 | Fed. Rep. of Germany. | |
| 115726 | 9/1979 | Japan | 318/777 |
| 61-35183 | 2/1986 | Japan. | |

Primary Examiner—Jonathan Wysocki
Attorney, Agent, or Firm—Joseph S. Tripoli; Joseph J. Laks; Harvey D. Fried

[57] ABSTRACT

A speed control circuit for triggering a motor, of the kind having a winding arrangement with multiple taps, comprises a plurality of electrical sources and a switching network coupled between the plurality of electrical sources and the taps of the winding arrangement. The switching network has selectively operable switches, for example, electronically controllable switches, for connecting more than one of the electrical sources to any one of the taps at the same time. A commutation controller is coupled to each of the electrical sources and each of the switches for operating the switches and the electrical sources. A feedback circuit provides information to the commutation controller with respect to the rotational speed and phase of the motor. The electrical sources may be arranged into groups, for accelerating and decelerating the motor. The electrical sources in each group may be connected to one another as partial electrical sources, the partial electrical sources of each group being connectable to any one of the taps at the same time. The respective groups of electrical sources may comprise complementary partial electrical sources of opposite polarity. The arrangement makes it possible for deceleration current to be applied to the winding arrangement without first interrupting an acceleration current, and vice versa. Rapid variations between various uniform operating speeds may be achieved without loss of synchronization between the motor and the control currents.

12 Claims, 1 Drawing Sheet

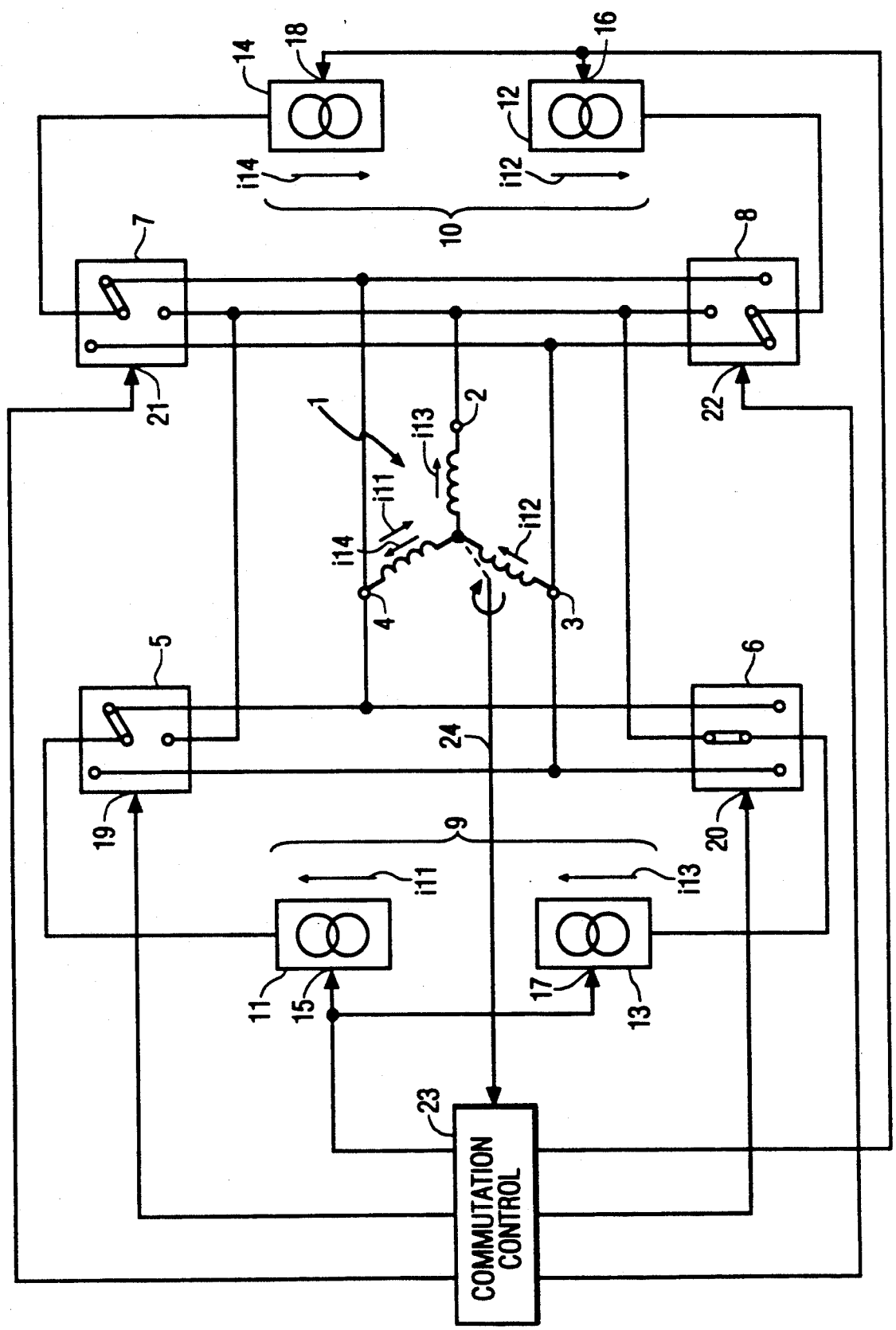

MOTOR CONTROL CIRCUIT

CROSS REFERENCE TO RELATED APPLICATION

This application is a continuation of application Ser. No. 328,255, filed Feb. 23, 1989, and now abandoned.

SUMMARY

The circuit arrangement for the triggering of motors comprises a winding arrangement the connections of which can be connected to electricity sources by means of a commutation facility.

Several or several groups of electricity sources can be connected to the same connections at the same time. Hereby, a rotary field causing deceleration can be superimposed upon a rotary field causing acceleration without the necessity of interrupting a control loop for the electricity source generating the rotary field causing acceleration.

The invention may particularly be applied to digital or analog tape recording devices.

BACKGROUND OF THE INVENTION

The invention is concerned with a circuit arrangement for the triggering of motors for example those used in digital or analog tape recording devices.

In motors for precision drives in which, apart from the exact observation of given speed values, some relevance also lies in rapid speed changes and adoption of changed speed values, it is known to connect the inputs (influences) of the winding arrangement to electricity sources by means of a commutation facility in order to make the rotor follow a given alternating field and to monitor the speed by feedback. Due to the mass driven, the desired reaction of the rotor is not without inertia, but subject to a more or less strong delay.

If the rotor is to adopt a higher speed the delay can be minimized in that, by triggering accordingly, a high turning moment with positive direction is applied to the rotor which is maintained until it is recognized by the feedback that the desired speed is reached and then the triggering is reduced again to the stationary turning moment with positive direction which is necessary to maintain the speed. A modification of speed towards a smaller value can easily be achieved particularly in that the stationary triggering is switched off, then an opposite turning moment, i.e. in the negative direction, is generated and, after the lowered speed is reached, the stationary triggering is reestablished. It is a problem in this method that the speed reached after decay of the negatively directed turning moment is not always absolutely identical with the desired speed, thereby making an additional process of deceleration or acceleration necessary. In addition, the commutation sequence of the connections of the winding arrangement has to be synchronized again with the present rotation of the rotor.

It would therefore be desirable to maintain the triggering for achievement of a positively directed turning moment even during the time in which the turning moment in the negative direction is impressed. Hereby, through the feedback, it would be achieved that the commutation sequence of the connections of the winding arrangement works in synchronization even during the process of deceleration. The problem here is, however, that the triggering facilities in their opposing effects on the rotor obstruct or even destroy each other.

The invention is concerned with the last named problem. Its object of the invention is to create a circuit arrangement for the triggering of motors which allows a very precise and fast reacting modification of speed towards higher as well as towards lower speed values.

The task is solved in a circuit arrangement according to the preamble of claim 1 by the characteristics stated in the characterizing clause.

SUMMARY OF THE INVENTION

The measures according to the invention allow use of the same winding arrangement for acceleration and deceleration. Hereby, by the function of the sources effectuating the feed-in of energy into the winding arrangement as sources of electricity an undisturbed overlay of the fed-in currents is achieved so that the sources of energy do not destroy each other when they become effective simultaneously. Instead of a single electricity source also groups of electricity sources may be used, whereby the number of electricity sources or partial electricity sources belonging to each group can be determined by the number of poles of the motor and, possibly, by whether uni- or bipolar triggering is selected.

Preferably, the electricity sources are designed to be triggerable independent of each other. This way the speed-synchronous commutation can be maintained if a speed monitoring facility is present, e.g. by means of a tachometer generator and a PLL circuit, whereby a modification of the speed of the motor is made by means of the other electricity source. When the other electricity source is switched off, the motor can then react and reach the original speed more quickly because it is not necessary to wait until, in case of a prior interruption, the speed-synchronous commutation is reestablished.

It is particularly advantageous to use the method according to the invention when the winding arrangement of the motor is triggered in a bipolar manner. This way, by better utilization of the copper, a higher turning moment and, thereby, a faster reaction to modification processes with the identical mass is achieved.

BRIEF DESCRIPTION OF THE DRAWING

A motor speed control circuit in accordance with this invention is shown in the sole FIGURE.

DETAILED DESCRIPTION OF THE PREFERRED EMBODIMENTS

The FIGURE shows, as part of a circuit arrangement for the triggering of motors in a block schematic diagram, a number of electricity sources which can be connected via a commutation facility to connections of a winding arrangement of the motor. Hereby, a three-phase winding arrangement 1 is connected by connections 2, 3 and 4 via commutation facilities 5, 6, 7 and 8 to groups of electricity sources 9 and 10. The commutation facilities may comprise electronically controlled switches. The groups of electricity source 9 and 10 each consist of one partial electricity source 11 or 12 for positively directed currents and partial electricity sources 13 or 14 for negatively directed currents. Thus, this arrangement allows a bipolar triggering of the motor.

If one of both groups of electricity sources 9 or 10 is in operation the partial electricity sources 11 and 13 or, respectively, 12 and 14 allocated to this group are always switched on at the same time. The groups of electricity sources 9 are used for acceleration whereas the groups of electricity sources 10 are used for deceleration. By means of the commutation circuits 5 and 7, the partial electricity sources 11 and 13 are connected each with those connections 2, 3, 4 of the winding arrangement 1 of the motor by which, under consideration of the position of the rotor to be driven, a rotary field causing acceleration can be generated. For deceleration, respectively, the same applies to the group of electricity sources 10 in which the partial electricity sources 12 and 14 can also be connected to connections 2, 3, 4 of the winding arrangement 1 by means of the commutation circuit facilities 6 and 8. Hereby, the situation may arise that two electricity sources are connected to the same connection simultaneously, e.g. partial electricity source 11 and partial electricity source 14 to connection 4. Because the sources of energy are designed as electricity sources, however, only a simple interference (superposition) of the currents occurs without the electricity sources themselves being endangered. The commutation facilities 5, 6, 7 and 8 as well as the groups of electricity sources 9 and 10 are equipped with control inputs 15, 16, 17, 18, 19, 20, 21, 22 which are connected to a control circuit 23. The control circuit 23 is thereby phase supported as indicated by a feedback 24. The rotary fields generated by the electricity sources 11, 12, 13, 14 in the winding arrangement 1 are therefore absolutely matched with the rotation movement of the motor.

This way an overlay of the rotary fields is possible which can lead to acceleration or deceleration in the desired way without the necessity of interrupting a control loop. A phase out of the commuted triggering, in which the winding arrangement 1 is fed currents from group 9 of electricity sources 11, 13 used for acceleration as well as from group 10 of electricity sources 12, 14 used for deceleration, is illustrated in the FIGURE.

In this phase the partial electricity source 11 is connected with connection 4, the partial electricity source 13 with connection 2, the partial electricity source 14 with connection 4 and the partial electricity source 12 with connection 3. A current $-i_{13}$ is fed into the winding arrangement 1 via connection 2, a current $+i_{12}$ via connection 3 and a current $+i_{11}-i_{14}$ via connection 4. The indices establish the relation to the electricity source supplying the current.

I claim:

1. A motor control circuit, comprising:
    an arrangement having a plurality of windings and connections for energizing a motor;
    at least one source of electricity for accelerating said motor and at least one source of electricity for decelerating said motor;
    a commutation facility for connecting said electricity sources to the same ones of said connections at the same time; and,
    control means for said commutation facility, for energizing said motor with currents of a given sense from said at least one source of electricity for accelerating said motor and for energizing said motor with currents of an opposite sense from said at least one source of electricity for decelerating said motor, said energizing currents of said given and opposite senses being superimposed when present together in any winding of said arrangement.

2. A circuit according to claim 1, wherein said electricity sources for accelerating and decelerating said motor can be controlled independently of each other.

3. A circuit according to claim 1, comprising a plurality of sources of electricity for accelerating said motor and a plurality of sources of electricity for decelerating said motor.

4. A circuit according to claim 3, wherein said electricity sources are arranged in groups and said groups of electricity sources comprise complementary, oppositely poled partial electricity sources which can be connected to different ones of said connections at the same time.

5. A circuit according to claim 1, wherein said commutation facility comprises a plurality of electronically controlled switches responsive to said control means.

6. A circuit arrangement according to claim 1, wherein said control means energizes said motor continuously with said currents of said given sense for accelerating said motor and energizes said motor on demand with said currents of said opposite sense for decelerating said motor.

7. A motor control circuit, comprising:
    an arrangement having a plurality of windings and connections for energizing a motor;
    respective pluralities of electricity sources for accelerating and decelerating said motor;
    a commutation facility for connecting groups of said electricity sources to the same ones of said connections at the same time; and,
    control means for said commutation facility, for energizing said motor continuously with currents of a given sense from said sources of electricity for accelerating said motor and for energizing said motor on demand with currents of an opposite sense from said sources of electricity for decelerating said motor, said currents of said given and opposite senses being superimposed when present together in any winding of said arrangement.

8. A circuit according to claim 7, wherein said groups of electricity sources for accelerating and decelerating said motor can be controlled independently of each other.

9. A circuit according to claim 7, wherein said electricity sources of said respective groups comprise complementary, oppositely poled partial electricity sources which can be connected to different ones of said connections at the same time.

10. A circuit according to claim 7, wherein said commutation facility comprises a plurality of electronically controlled switches responsive to said control means.

11. A circuit arrangement according to claim 1, wherein said control means comprises a phase control loop which operates continuously during both acceleration and deceleration of said motor responsive to said continuous energizing currents of said given sense for accelerating said motor.

12. A circuit arrangement according to claim 7, wherein said control means comprises a phase control loop which operates continuously during both acceleration and deceleration of said motor responsive to said continuous energizing currents of said given sense for accelerating said motor.

* * * * *